(12) United States Patent
Balster et al.

(10) Patent No.: US 6,737,637 B1
(45) Date of Patent: May 18, 2004

(54) ILLUMINATOR FOR ILLUMINATING MULTIPLE TARGETS

(75) Inventors: Michael A. Balster, Los Altos, CA (US); Arthur N. Hicks, San Jose, CA (US)

(73) Assignee: Credence Systems Corporation, Milpitas, CA (US)

( * ) Notice: Subject to any disclaimer, the term of this patent is extended or adjusted under 35 U.S.C. 154(b) by 132 days.

(21) Appl. No.: 10/193,826

(22) Filed: Jul. 12, 2002

(51) Int. Cl.[7] .................................................. G01J 1/00
(52) U.S. Cl. ....................................... 250/228; 356/236
(58) Field of Search ................................. 250/228, 216, 250/226, 208.1; 356/236, 445, 446

(56) References Cited

U.S. PATENT DOCUMENTS 6,088,117 A * 7/2000 Imura et al. ................ 356/445
6,625,558 B1 * 9/2003 Van Ausdall et al. ....... 702/117

* cited by examiner

Primary Examiner—Kevin Pyo
(74) Attorney, Agent, or Firm—John Smith-Hill; Smith-Hill and Bedell

(57) ABSTRACT

A plurality of image sensors are tested concurrently by supplying light emitted by a light source to a first integrating sphere having an input port that receives the light emitted by the light source and having an output port providing output light. The output light of the first integrating sphere is spatially divided to provide a plurality of divided lights and the plurality of divided lights are supplied to a plurality of second integrating spheres respectively, each second integrating sphere having an input port that receives a divided light and an output port providing an output light. The output lights of the second integrating spheres are directed onto active regions of respective image sensors.

7 Claims, 1 Drawing Sheet

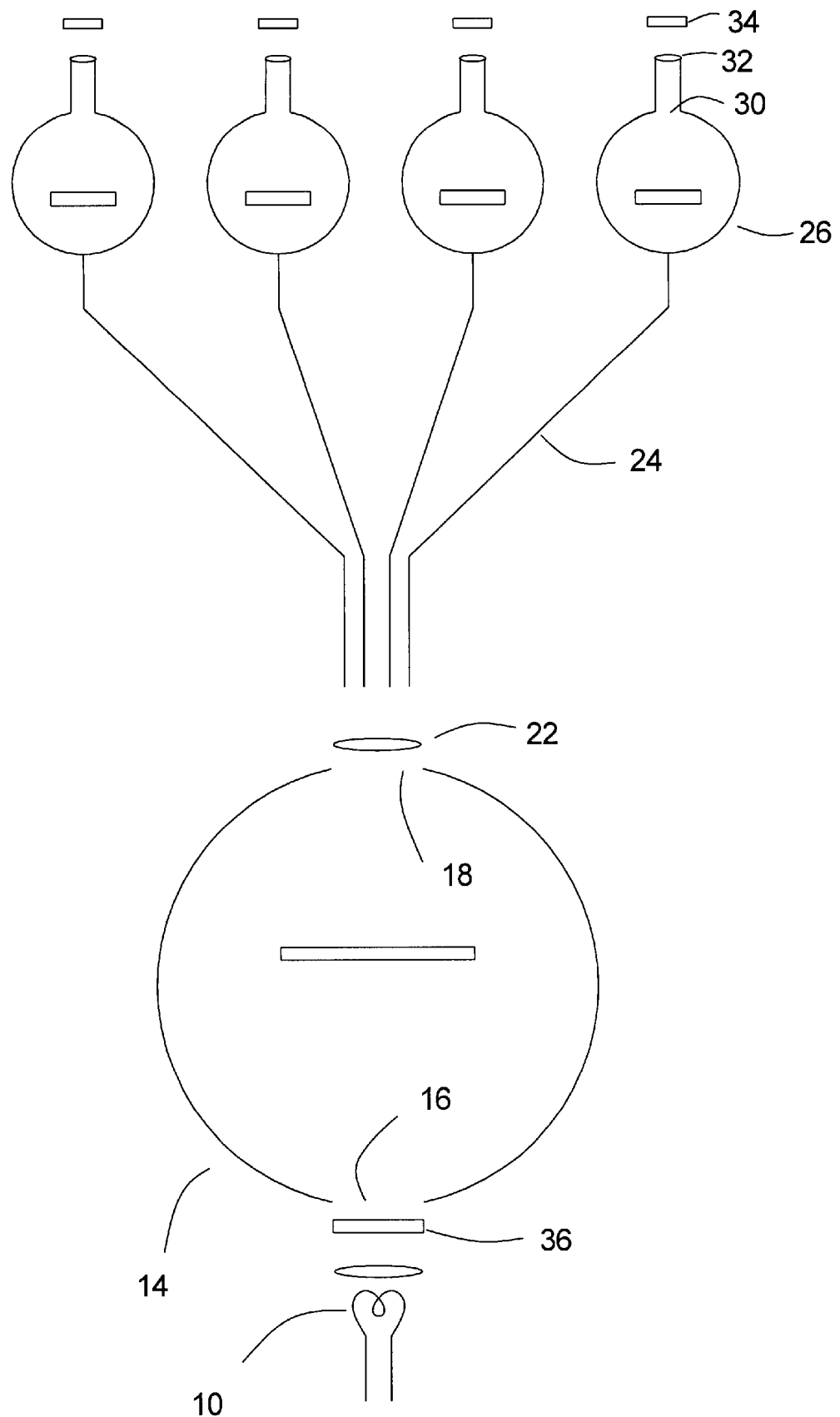

ILLUMINATOR FOR ILLUMINATING MULTIPLE TARGETS

BACKGROUND OF THE INVENTION

This invention relates to an illuminator for illuminating multiple targets.

A known CMOS image sensor is composed of 16 million pixels uniformly distributed over an active area that is approximately 15 mm square. Each pixel has a sensitive region that converts incident radiation into electrical charge and is provided over its front surface with an optical element that includes a condensing lens for concentrating incident light on the sensitive region and a band pass filter for passing only a fairly narrow wavelength range, so that the pixel is sensitive to a fairly narrow range of wavelengths. In general, pixels of a first group are sensitive to red light, pixels of a second group are sensitive to green light and pixels of a third group are sensitive to blue light, and the pixels that are sensitive to a given color are uniformly distributed over the sensitive area of the device. When a pixel is illuminated with light of the wavelength to which it is sensitive, it generates a charge packet of magnitude that depends on the intensity with which it is illuminated. A readout circuit converts the charge packets generated by the pixels respectively to a voltage signal.

When a pixel is illuminated, its response depends on the sensitivity of the pixel and the intensity of the light incident on the pixel. Generally, it is desirable that all pixels of a given color should be of equal sensitivity, so that the response of each pixel of a given color to illumination of a given intensity is the same. Thus, if all the blue pixels, i.e. the pixels that are sensitive to blue light, are illuminated with blue light at a given intensity, the charge packets generated by the blue pixels should all be of the same magnitude.

It is desirable that a CMOS image sensor should be tested before it is incorporated in a larger product, such as a camera. A CMOS image sensor can be tested by illuminating the active area of the sensor with broad band light that is uniform in intensity and spectral content over the entire active area and has a high degree of flatness (the local uniformity or relative uniformity of illumination over adjacent pixels). Analysis of the voltage signal provided by the readout circuit then provides information regarding variations in sensitivity of the pixels of a given color.

Conventionally, a CMOS image sensor is tested using a point light source that emits broad band light. The point source is controlled so that its intensity does not vary substantially with time. The light emitted by the point source is filtered, integrated and collimated and then illuminates the active area of the image sensor. Using a point light source and optical conditioning, it is possible to maintain a high degree of field flatness and uniformity of illumination over the active area of an image sensor.

The cost of testing an image sensor is a significant part of the total cost of producing the sensor. One strategy for reducing the cost of image sensors, and thereby promoting demand for image sensors, is to reduce the cost of testing each sensor.

One conventional technique for reducing the cost of test of semiconductor devices having electrical inputs is multi-site testing. In multi-site testing, multiple devices are tested simultaneously in roughly the time taken to test a single device. In order to employ multi-site testing for image sensor testing, it is necessary that field flatness and uniformity be maintained over multiple sensors. However, it is difficult, or impossible, to maintain sufficient field flatness and uniformity of illumination over the active areas of multiple image sensors to allow multi-site testing of the image sensors using a point source and optical conditioning.

Use of an extended light source instead of a point source would allow a larger area to be illuminated, but an extended light source will generally vary in intensity over its extent and therefore the response of a pixel will depend not only on the sensitivity of a pixel but also on the location of the pixel.

SUMMARY OF THE INVENTION

In accordance with a first aspect of the invention there is provided a method of concurrently testing a plurality of image sensors, comprising (a) providing a light source emitting light, (b) supplying the light emitted by the light source to a first integrating sphere having an input port that receives the light emitted by the light source and having an output port providing output light, and (c) spatially dividing the output light of the first integrating sphere to provide a plurality of divided lights, (d) supplying the plurality of divided lights to a plurality of second integrating spheres respectively, each second integrating sphere having an input port that receives a divided light and an output port providing an output light, and (e) directing the output lights of the second integrating spheres onto active regions of respective image sensors.

In accordance with a second aspect of the invention there is provided apparatus for testing image sensors, comprising a first integrating sphere having an input port for receiving light emitted by a light source and also having an output port for emitting light, a plurality of second integrating spheres each having an input port for receiving light and also having an output port for emitting light towards the image sensors respectively, and a spatial multiplexer for receiving light emitted by the first integrating sphere and directing the received light to the input ports of the second integrating spheres respectively.

BRIEF DESCRIPTION OF THE DRAWINGS

For a better understanding of the invention, and to show how the same may be carried into effect, reference will now be made, by way of example, to the accompanying drawing, the single FIGURE of which is a schematic diagram of apparatus for illuminating multiple image sensors.

DETAILED DESCRIPTION

The drawing illustrates schematically the apparatus for simultaneously illuminating several image sensors under test. By way of example, each image sensor may be composed of as many as 16 million pixels and have an active area that is as much as 15 mm square, as described above.

The illustrated apparatus comprises an extended light source 10 that emits broad band light. The light source may be a filament bulb. Light emitted by the light source enters a first integrating sphere 14. An integrating sphere is a hollow sphere having an input port through which light enters the sphere, an output port from which light leaves the sphere, an internal baffle that prevents light from passing directly from the input port to the output port, and an internal diffusely reflecting coating.

Notwithstanding non-uniformity in the optical field at the input port 16 of the integrating sphere 14, the optical field at the output port 18 is highly uniform, i.e. the intensity of light at the output port is independent of position, in a plane perpendicular to the optical axis of the sphere, over a short distance from the output port. However, the uniformity drops rapidly with distance from the output port due to the exit angle of the light from the integrating sphere.

A collimator lens 22 collimates the output light from the integrating sphere 14 and provides a collimated light beam that is incident on the input ends of several fiber optic light pipes 24, each comprising a bundle of optical fibers secured together both at the input end and at the output end of the light pipe. In this manner, the collimated light from the integrating sphere 14 is divided into four optical fluxes propagating along the light pipes 24 respectively.

Each individual fiber of one of the light pipes 24 receives a small proportion of the optical flux emitted from the output port 18 and transmits the flux to its output end. Since the optical transmission characteristics of the optical fibers that form a given light pipe are not necessarily uniform over all the individual fibers, the optical flux at the output end of the light pipe is not necessarily uniform.

At its output end, each fiber optic light pipe 24 is coupled to the input port of an integrating sphere 26. The integrating sphere 26 receives the output light flux from the fiber optic light pipe 24 at its input port and provides a uniform optical flux at its output port 30. A collimator 32 recollimates the output light flux of the integrating sphere 26 and provides a light beam directed towards the active area of an image sensor under test 34. The image sensor under test 34 is positioned so that its active area is perpendicular to the axis of the beam provided by the collimator 32.

The collimator 32 is designed so that the light incident on the active area of the image sensor under test 34 is within one degree of perpendicular to the active area. In the drawing, the collimator 32 is schematically illustrated as a lens. The focal length of this lens is chosen to achieve a desired level of collimation. Since the image sensor under test is close to the lens, a high degree of collimation is not essential. Alternatively, the collimator 32 may be in the form of a fiber optic taper comprising multiple fiber bundles each at a predetermined angle relative to the axis of the collimator. Light leaves each bundle at a predictable angle due to the orientation of the bundle.

Filters 36 are interposed between the incandescent bulb 10 and the input port of the integrating sphere 14 in order to restrict the spectrum of light entering the integrating sphere 14 to the visible part of the spectrum.

It will be appreciated that the invention is not restricted to the particular embodiment that has been described, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. A method of concurrently testing a plurality of image sensors, comprising:
   (a) providing a light source emitting light,
   (b) supplying the light emitted by the light source to a first integrating sphere having an input port that receives the light emitted by the light source and having an output port providing output light, and
   (c) spatially dividing the output light of the first integrating sphere to provide a plurality of divided lights,
   (d) supplying the plurality of divided lights to a plurality of second integrating spheres respectively, each second integrating sphere having an input port that receives a divided light and an output port providing an output light, and
   (e) directing the output lights of the second integrating spheres onto active regions of respective image sensors.

2. A method according to claim 1, comprising collimating the output light of the first integrating sphere prior to spatially dividing the output light.

3. A method according to claim 1, comprising collimating the output light of the second integrating spheres.

4. A method according to claim 1, wherein step (a) comprises providing an incandescent light source that emits visible light and infrared light and the method further comprises filtering the light emitted by the light source to remove infrared light from the light supplied to the first integrating sphere.

5. Apparatus for testing image sensors, comprising:
   a first integrating sphere having an input port for receiving light emitted by a light source and also having an output port for emitting light,
   a plurality of second integrating spheres each having an input port for receiving light and also having an output port for emitting light towards the image sensors respectively, and
   a spatial multiplexer for receiving light emitted by the first integrating sphere and directing the received light to the input ports of the second integrating spheres respectively.

6. Apparatus according to claim 5, further comprising a collimator for collimating light emitted by the first integrating sphere.

7. Apparatus according to claim 5, comprising a plurality of collimators for collimating light emitted by the second integrating spheres.

* * * * *